US006713160B2

(12) United States Patent
Kitamura et al.

(10) Patent No.: US 6,713,160 B2
(45) Date of Patent: Mar. 30, 2004

(54) INK JET RECORDING MATERIAL

(75) Inventors: Ryu Kitamura, Chiba (JP); Eriko Endo, Saitama (JP); Tomomi Takahashi, Tokyo (JP); Kazuaki Ohshima, Yokohama (JP)

(73) Assignee: Oji Paper Co., Ltd., Tokyo (JP)

( * ) Notice: Subject to any disclaimer, the term of this patent is extended or adjusted under 35 U.S.C. 154(b) by 0 days.

(21) Appl. No.: 10/307,445

(22) Filed: Dec. 2, 2002

(65) Prior Publication Data

US 2003/0134093 A1 Jul. 17, 2003

Related U.S. Application Data

(63) Continuation-in-part of application No. 09/502,824, filed on Feb. 11, 2000, now abandoned.

(30) Foreign Application Priority Data

| | | |
|---|---|---|
| Feb. 16, 1999 | (JP) | 11-36846 |
| Apr. 2, 1999 | (JP) | 11-96030 |
| Jul. 8, 1999 | (JP) | 11-194084 |
| Jul. 23, 1999 | (JP) | 11-208508 |

(51) Int. Cl.$^7$ .................... B32B 27/20

(52) U.S. Cl. .................... 428/195; 428/219; 428/331; 428/323; 428/339; 428/329; 428/402; 428/446; 428/474.4; 428/477.7; 428/500; 428/689; 428/704; 428/913

(58) Field of Search .................... 428/195, 219, 428/323, 329, 331, 341, 339, 402, 446, 474.4, 477.7, 470, 500, 704, 913, 689

(56) References Cited

U.S. PATENT DOCUMENTS

| | | | | |
|---|---|---|---|---|
| 5,500,668 A | * | 3/1996 | Malhotra et al. | 347/105 |
| 2002/0115773 A1 | * | 8/2002 | Katoh et al. | 524/413 |

* cited by examiner

*Primary Examiner*—Deborah Jones
*Assistant Examiner*—Ling Xu
(74) *Attorney, Agent, or Firm*—Arent Fox Kintner Plotkin & Kahn

(57) ABSTRACT

An ink jet recording material which enables the recorded ink images to exhibit enhanced light fastness, water resistance and hot moisture resistance, includes an ink receiving layer formed on a support material and containing a light fastness-enhancing agent containing hydroquinone-β-D-glucoside, a salt of pyrocatechol-3,5-disulfonic acid and/or salt of p-hydroxybenzenesulfonic acid, and an inorganic pigment and a cationic polymeric material which are in the form of a plurality of composite particles prepared by mixing an aqueous dispersion of inorganic pigment particles with a cationic polymeric material having a molecular weight of 100,000 or more, to cause the aqueous dispersion of the inorganic pigment particles to be coagulated with the cationic polymeric material, and subjecting the resultant coagulate of the inorganic pigment with the cationic polymeric material to pulverization to form inorganic pigment-cationic polymeric material composite particles having an average composite particle size of 10 to 1,000 nm.

17 Claims, No Drawings

INK JET RECORDING MATERIAL

CROSS-REFERENCE TO RELATED APPLICATION

This application is a continuation-in-part of application Ser. No. 09/502,824, filed Feb. 11, 2000, now abandoned.

BACKGROUND OF THE INVENTION

1. Field of the Invention

The present invention relates to an ink jet recording material. More particularly, the present invention relates to an ink jet recording material capable of enhancing the light fastness of ink images recorded thereon.

2. Description of the Related Art

An ink jet recording system, in which an aqueous ink is jetted imagewise through a fine opening of a jetting nozzle toward a recording material to form ink images, is advantageous in that printing noise is low, full colored images can be easily recorded, the recording can be effected at a high speed, and the ink jet printer is cheaper than other printers and, thus, the application of the ink jet recording system has progressed in many fields including, for example, terminal printers for computers, facsimile machines, plotters, and book and slip printers.

Currently, as the use of the ink jet printer has been rapidly expanded and the quality of the printed images has been improved, the ink jet recording material is strongly required not only to have a good appearance but also to be capable of imparting a high stability to the ink images recorded thereon, particularly a high resistance of the recorded ink images to light. However, as the inks for the ink jet recording system must satisfy requirements of not blocking the ink jet nozzle and of having a brilliant hue, the inks are not always selected from pigment inks and dye inks having a high light fastness.

To solve the above-mentioned problems, a plurality of attempts for enhancing the light fastness of ink images printed on the ink-jet recording material by adding various resistance-enhancing materials to the recording material have been made. For example, Japanese Unexamined Patent Publication No. 57-87,988 discloses an ink jet recording sheet containing, as at least one component, an ultraviolet ray-absorbing agent. Japanese Unexamined Patent Publication No. 61-146,591 discloses an ink jet recording medium usable for recording images thereon by using an aqueous ink containing a water-soluble dye, characterized by containing therein a hindered amine compound. Japanese Unexamined Patent Publication No. 4-201,594 discloses a recording material comprising a base material and an ink receiving layer formed on the base material and characterized in that the ink receiving layer contains super fine particles of transition metal compounds. The above-mentioned recording materials exhibit, to a certain extent, a light fastness-enhancing effect for the ink images recorded thereon. However, they are disadvantageous in that the recording materials exhibit a poor ink-absorbing property, the light fastness-enhancing effect is insufficient in practice and, after fading, the faded colors are badly balanced.

Also, Japanese Unexamined Patent Publication No. 61-57,380 discloses an ink jet recording medium for recording thereon ink images formed by using an aqueous ink containing a water-soluble dye, characterized in that the recording medium contains a porous inorganic pigment, a cationic resin and a magnesium compound having a very poor water solubility. Japanese Unexamined Patent Publication No. 57-87,987 discloses an ink jet recording sheet for recording thereon images formed from an ink containing an acid dye or a mordant dye, comprising at least one member selected from molybdic acid and tannic acid and contained in or coated on a base sheet. They can enhance the light fastness of the ink images recorded thereon, but the enhanced light fastness may not be sufficient. However, when the printed sheet is stored for a long time, the light fastness of the recorded ink images is insufficient, and the molybdic acid is unsatisfactory in that, after fading, the color balance is lost and the non-printed portions of the recording sheet become discolored.

Accordingly, an ink jet recording material free from the above-mentioned disadvantages is in strong demand.

SUMMARY OF THE INVENTION

An object of the present invention is to provide an ink jet recording material providing high light fastness to ink images recorded thereon.

The above-mentioned object can be attained by the ink jet recording material of the present invention which comprises a support material and at least one ink receiving layer formed on at least one surface of the support material and comprising a light fastness-enhancing agent for ink images received on the ink receiving layer, an inorganic pigment and a cationic polymeric material, wherein the light fastness-enhancing agent comprises at least one member selected from the group consisting of hydroquinone-β-D-glucoside, salts of pyrocatechol-3,5-disulfonic acid and salts of p-hydroxybenzenesulfonic acid, and the inorganic pigment and the cationic polymeric material are in the form of a plurality of composite particles prepared by mixing an aqueous dispersion of inorganic pigment particles with a cationic polymeric material having a molecular weight of 100,000 or more, to cause the aqueous dispersion of the inorganic pigment particles to be coagulated with the cationic polymeric material, and subjecting the resultant inorganic pigment-cationic polymeric material coagulated particles to pulverization to form inorganic pigment-cationic polymeric material composite particles having an average composite particle size of 10 to 1,000 nm.

In the ink jet recording material of the present invention, the light fastness enhancing agent is preferably present in an amount of 0.3 to 30% by mass based on the mass of the ink receiving layer.

In the ink jet recording material of the present invention, the amount of the light fastness-enhancing agent is preferably 1 to 10% by mass based on the mass of the ink receiving layer.

In the ink jet recording material of the present invention, the salt of pyrocatechol-3,5-disulfonic acid and the salt of p-hydroxy-benzenesulfonic acid are preferably sodium pyrocatechol-3,5-disulfonate and sodium p-hydroxybenzenesulfonate, respectively.

In the ink jet recording material of the present invention, the inorganic pigment preferably comprises at least one member selected from the group consisting of silica, alumina and aluminosilicate.

In the ink jet recording material of the present invention, the cationic polymeric material preferably comprises at least one member selected from polydiallyldimethyl ammonium chloride, polyacrylamide, polydiallylamine-hdyrochloric acid salt, polyvinylamine, polyalkylenepolyamine-dicyandiamide condensation product, and polymers and copolymers of secondary amine-epichlorohydrin.

In the ink jet recording material of the present invention, a ratio in mass of the inorganic pigment to the cationic polymeric material is preferably 100:1 to 100:50.

In the ink jet recording material of the present invention, the ratio in mass of the inorganic pigment to the cationic material is more preferably in the range of from 100:2 to 100:30.

In the ink jet recording material of the present invention, the inorganic pigment-cationic polymeric material composite particles are preferably present in a content of 70 to 95% by mass in the ink receiving layer.

In the ink jet recording material of the present invention, in the inorganic pigment-cationic polymeric material composite particles contained in the ink receiving layer, the cationic polymeric material is preferably present in an amount of 0.01 to 10 g per $m^2$ of the surface area of the recording material.

In the ink jet recording material of the present invention, the ink receiving layer is preferably formed on the support material in such a manner that a layer containing the light fastness-enhancing agent and the inorganic pigment-cationic polymeric material composite particles is formed on a casting surface of a casting base, and then is brought into contact with a surface of the support material under pressure so as to transfer the cast layer to the support material surface, and the cast layer on the support material is separated from the casting surface of the casting base.

The ink jet recording material of the present invention, preferably has a gloss of 20% or more determined at incident and reflection angles of 75 degrees in accordance with Japanese Industrial Standard P8142.

In the ink jet recording material of the present invention, the ink receiving layer optionally further comprises at least one inorganic salt.

In the ink jet recording material of the present invention, the inorganic salt is preferably selected from inorganic salts of di- or more valent metals.

In the ink jet recording material of the present invention, the inorganic salt is preferably selected from the group consisting of inorganic magnesium salts and inorganic calcium salts.

In the ink jet recording material of the present invention, wherein the ink receiving layer optionally further comprises at least one member selected from the group consisting of salts of phosphoric acid and salts of nitric acid.

In the ink jet recording material of the present invention, the phosphoric acid salts are preferably selected from the group consisting of salts of glycerol-phosphoric acid and metaphosphoric acid.

In the ink jet recording material of the present invention, the inorganic pigment preferably comprises a plurality of secondary particles having an average particle size of 10 to 500 nm, each secondary particle comprising a plurality of primary particles having an average primary particle size of 3 to 40 nm, and agglomerated with each other to form the secondary particle.

DESCRIPTION OF THE PREFERRED EMBODIMENTS

The ink jet recording material, of the present invention, comprises a support material and at least one ink receiving layer formed on at least one surface of the support material and comprising a light fastness-enhancing agent for ink images received on the ink receiving layer, an inorganic pigment and a cationic polymeric material.

The light fastness-enhancing agent comprises at least one member selected from the group consisting of hydroquinone-β-D-glucoside, salts of pyrocatechol-3,5-disulfonic acid and salts of p-hydroxybenzenesulfonic acid. Also, the inorganic pigment and the cationic polymeric material are in the form of a plurality of composite particles prepared by mixing an aqueous dispersion of inorganic pigment particles with a cationic polymeric material having a molecular weight of 100,000 or more, to cause the aqueous dispersion of the inorganic pigment particles to be coagulated with the cationic polymeric material, and subjecting the resultant inorganic pigment-cationic polymeric material coagulated particles to pulverization to form inorganic pigment-cationic polymeric material composite particles having an average composite particle size of 10 to 1,000 nm.

The support material for the ink jet recording material of the present invention comprises a paper sheet, a synthetic paper sheet, a film or a resin-coated paper sheet and is coated by at least one ink receiving layer formed on at least one surface of the support material. Each ink receiving layer may be formed in multiple layers.

The paper sheet can be produced by a paper-forming procedure using a pulp slurry and optionally sized with a sizing agent. The film can be produced by a film-forming procedure using a melt or solution of a polymeric material. The resin-coated paper sheet can be produced by coating at least one surface of a paper sheet with a polymeric material.

The pulp slurry, film-forming polymeric material or the polymeric coating material optionally contains a cationic resin, an non-cationic resin and/or a pigment.

The ink jet recording material of the present invention optionally has an appearance similar to that of a gloss coated paper sheet. In this case, the at least one gloss layer is formed on the outermost surface of recording material. In an embodiment, the gloss layer comprises, as a principal component, a resin and, in another embodiment, the gloss layer comprises, as a principal component, fine pigment particles having a particle size of 1.0 μm or less. Optionally, an undercoat layer is formed between the ink receiving layer and the upper gloss layer. The gloss layer can be formed by a film transfer method or a cast method.

In the ink jet recording material of the present invention, the ink receiving layer comprises a light fastness-enhancing agent, for ink images recorded on the recording material, comprised in the support material.

The light fastness-enhancing agent comprises at least one member selected from the group consisting of hydroquinone-β-D-glucose (namely arbutin), salts of pyrocatechol-3,5-disulfonic acid and salts of p-hydroxybenzenesulfonic acid (namely p-phenosulfonic acid salts).

The reason the light fastness of the recorded ink images is enhanced to an great extent by the specific light fastness-enhancing agent of the present invention has not yet been completely made clear. It is assumed that the coloring dyes or pigments contained in the inks for the ink jet recording system and exhibiting a low light fastness when directly exposed to light, are protected by the light fastness-enhancing agent contained in the ink receiving layer from the light by a certain mechanism. This mechanism has not yet been made clear.

In the ink jet recording material of the present invention, the light fastness enhancing agent is preferably present in an amount of 0.3 to 30% by mass more preferably 1 to 10% by mass, still more preferably 3 to 8% based on the mass of the ink receiving layer.

For the light fastness enhancing agent, the salt of pyrocatechol-3,5-disulfonic acid and the salt of p-hydroxy-benzenesulfonic acid are preferably sodium pyrocatechol-3, 5-disulfonate and sodium p-hydroxy-benzenesulfonate, respectively.

In the ink jet recording sheet of the present invention, the ink receiving layer contains inorganic pigment particles and a cationic polymeric material which are in the form of a plurality of composite particles having an average composite particle size of 10 to 1,000 nm, preferably 30 to 700 nm, more preferably 50 to 500 nm. The inorganic pigment-cationic polymeric material composite particles are prepared by mixing an aqueous dispersion of inorganic pigment particles with a cationic polymeric material having a molecular weight of 100,000 or more, preferably 150,000 or more, more preferably 160,000 to 400,000, to cause the aqueous dispersion of the inorganic pigment particles to be coagulated with the cationic polymeric material, and subjecting the resultant coagulate of the inorganic pigment with the cationic polymeric material to pulverization to form inorganic pigment-cationic polymeric material composite particles of the above-mentioned average composite particle size.

The inorganic pigment-cationic polymeric material composite particles enables the resultant ink receiving layer to exhibit an enhanced color density and clarity of the recorded ink images, a high resistance to blotting of the ink images, and an enhanced water resistance.

When the average composite particles size is less than 10 nm, the resultant ink receiving layer is disadvantageous in that the printed ink images blot and are uneven due to a decrease in water absorption of the ink receiving layer, and when the size is more than 1,000 nm, the resultant ink receiving layer is disadvantageous in decreased gloss and increased roughness of the ink receiving layer surface and decreased color density of the recorded ink images.

If the molecular weight of the cationic polymeric material is less than 100,000, the resultant ink receiving layer exhibits an unsatisfactory resistance of the recorded ink images to moisture at a high temperature of, for example, 30° C. or more.

In the ink jet recording material of the present invention, the inorganic pigment preferably comprises at least one member selected from the group consisting of silica, alumina and aluminosilicate, more preferably silica.

Also, in the ink jet recording material of the present invention, the cationic polymeric material preferably comprises at least one member selected from diallyldimethyl ammonium chloride, acrylamide, diallylamine hydrochlorate, polyvinylamine, polyalkylenepolyamine-dicyandiamide condensation product, and polymers and copolymers of secondary amine-epichlorohydrin.

Further, in the ink jet recording material of the present invention, a ratio in mass of the inorganic pigment to the cationic polymeric material is preferably 100:1 to 100:50, more preferably 100:2 to 100:30, still more preferably 100:5 to 100:15. When the ratio is more than 100:1, the resultant ink receiving layer may be disadvantageous in decreased water resistance and heat-moisture resistance, and when the ratio is less than 100:50, the resultant ink receiving layer may be disadvantageous in a decreased ink absorption.

Furthermore, in the ink jet recording material as claimed in claim 1, wherein the inorganic pigment-cationic polymeric material composite particles are preferably present in a content of 70 to 95% by mass, more preferably 75 to 85% by mass, in the ink receiving layer. When the content is less than 70% by mass, the resultant ink receiving layer may be disadvantageous in a decreased ink absorption, and if the content is more than 95% by mass, the resultant ink receiving layer may be disadvantageous in that the recorded ink images exhibits an unsatisfactory light fastness due to the decreased content of the light fastness enhancing agent and the resultant ink receiving layer exhibits an unsatisfactory mechanical strength. Moreover, in the inorganic pigment-cationic polymeric material composite particles contained in the ink receiving layer of the ink jet recording material of the present invention, the cationic polymeric material is preferably present in an amount of 0.01 to 10 g more preferably 0.1 to 5 g, per $m^2$ of the surface area of the recording material. If the amount of the cationic polymeric material contained in the composite particles is less than 0.01 $g/m^2$, the resultant ink receiving layer is disadvantageous in decreased water resistance and heat moisture resistance, and if the amount is more than 10 $g/m^2$, the resultant ink receiving layer is disadvantageous in a decreased ink absorption.

The ink receiving layer of the ink jet recording material optionally contains, in addition to the light fastness enhancing agent and the inorganic pigment-cationic polymeric material composite particles, a pigment and a hydrophilic polymer.

When the pigments and hydrophilic polymers are employed together, the resultant recording material may exhibit an enhanced water resistance, a good ink-absorbing rate, and a good ink-drying property.

The ink receiving layer may contain a water-soluble polymeric material and/or a water-dispersible polymeric material mixed with the light fastness enhancing agent and the inorganic pigment-cationic polymeric material composite particles.

The polymeric materials usable for the ink receiving layer preferably comprises at least one member selected from water-soluble polymeric materials, for example, polyvinyl alcohol, modified polyvinyl alcohols, for example, cation-modified polyvinyl alcohols and silyl-modified polyvinyl alcohols, natural polymeric materials, for example, gelatin, casein, soybean protein, starch and cationic starches, and cellulose derivatives, for example, carboxymethylcellulose, methylcellulose, hydroxypropylcellulose, hydroxypropylmethylcellulose and vinylpyrrolidone polymers and copolymers; hydrohylic, water-insoluble polymeric materials, for example, polyurethanes, polyesters, sodium polyacrylate, latices of vinyl copolymers, for example, latices of acrylic copolymers and latices of styrene-vinyl acetate copolymers, and aqueous dispersions of conjugated diene polymers and copolymers, for example, of styrene-butadiene copolymers and methyl methacrylate-butadiene copolymers. The above-mentioned polymeric materials can be employed as an ink-absorbing material to form, as a principal component, the ink receiving layer. In view of a high ink absorption, the polymeric materials for the ink receiving layer are preferably selected from the water-soluble polymeric materials.

The polymeric material may be employed as a binder component for forming an ink receiving layer comprising, as principal components, the light fastness enhancing agent and the inorganic pigment-cationic polymeric material composite particles. In this case, there is no limitation to the mixing ratio of the inorganic pigment in the composite particles to binder. Usually, the mixing dry weight ratio of the inorganic pigment to the binder is preferably controlled to 100:2 to 100:200, more preferably 100:5 to 100:100. When the content of the binder is too high, the total volume of gaps formed between the pigment particles may become too small and thus the ink-absorbing rate of the resultant ink receiving layer may be insatisfactory. Also, when the content of the binder is too low, the resultant ink receiving layer may exhibit an insufficient resistant to cracking and the resultant ink images recorded thereon may exhibit an unsatisfactory accuracy and color density.

When an ink receiving layer comprising, as a component, the water soluble polymeric materials or the water-dispersible polymeric material, is formed on a support material, the resultant ink jet recording material exhibits an enhanced gloss. However, to enhance the ink absorption property, the ink receiving layer should contain the fine particles of the inorganic pigment-cationic polymeric material composite particles in a high content. In this case, however, the composite particles should be contained in a content of 10% by weight or less, preferably 5% by weight or less. The addition of the pigments contribute to enhancing the resistance of the resultant recording materials to blocking and to controlling the gloss of the resultant recording material.

The ink receiving layer may be a multi-layered ink receiving layer. When the uppermost layer of the ink receiving layer comprises, in addition to the light fastness enhancing agent and the inorganic pigment-cationic polymeric material composite particles, (1) a water-soluble polymeric material layer or (2) fine pigment particles having a particle size of 1 μm or less, the resultant ink jet recording material exhibits an enhanced gloss and high color density of the enhanced ink images.

Also, the lower layer in the multilayered ink receiving layer may be formed from, for example, the above-mentioned polymeric materials. Otherwise, the lower layer may be formed from a mixture of the polymeric material with the pigment particles having the above-mentioned particle size or "a particle size different from the above-mentioned particle size.

The pigments usable, in addition to the composite particles, for the ink jet recording material of the present invention optionally comprise at least one member selected from porous inorganic pigments, for example, amorphous silica, colloidal silica, aluminosilicate, aluminum silicate, alumina, hydrated alumina, aluminum hydroxide, pseudo-boehmite, kaolin, clay calcined clay, calcined kaolin, zinc oxide, tin oxide, magnesium sulfate, calcium carbonate, satin white, magnesium silicate, magnesium carbonate, magnesium oxide, diatomaceous earth, and smectite; and fine particulate organic pigments, for example, styrene polymer plastic pigments, urea resin plastic pigments, for example, urea-formaldehyde resin pigments, melamine-formaldehyde resin pigments, and benzoquanamine-formaldehyde resin pigments. For the recording material of the present invention, the inorganic pigments are preferably employed and, particularly, amorphous silica, aluminosilicate, colloidal silica and alumina are more preferably employed. More particularly, the amorphous silica and aluminosilicate pigments are more preferably employed.

When the ink receiving layer contains, as an optional pigment particles having a particle size larger than 1 μm, for example, from 2 to 20 μm, the resultant ink jet recording material exhibit an enhanced ink-absorbing property and is utilized for a mat grade (delustered) ink jet recording material.

For the use of forming images like silver salt photographic images, the ink receiving layer preferably comprises, as an optional component, pigment particles having a particle size or an agglomerated (secondary) particle size when the particles consists of agglomerates of fine primary particles, of 1 μm or less, more preferably 800 nm or less, still more preferably 600 nm or less. In this case, the resultant ink jet recording material exhibits an enhanced ink-absorbing property and a high gloss and a high color density of the recorded ink images.

For example, the fine secondary particles of the optional pigment having an average secondary particle size of 1 μm or less can be prepared by applying a strong mechanical shearing force to a coagulated particles of the pigment having an average particle size of several μm and available in the trade. Namely, they can be produced from the trade-available coagulated pigment particles by a mechanical breaking-down method in which lumps of the coagulated pigment particles are finely pulverized. The mechanical breaking-down means include ultrasonic homogenizers, press-homogenizers, nanomizers, high speed rotation mills, roller mills, container-driving medium mills, medium-stirring mills, jet mills and sand grinders.

The term "average particle size" used in the present invention refers to an average of sizes (martin diameters) of particles determined by using an electron microscope (including SEM and TEM), unless specifically described otherwise. In the determination, "FINE PARTICLE HAND BOOK" published in 1991 by ASAKURA SHOTEN, page 52 was referred to. The martin diameters of particles located within an area of 5 cm×5 cm of a sample were measured by the electron microscope in a magnification of 10,000 to 400,000, and the average of the measured data was calculated.

In the present invention, the fine particles of the optional pigment having an average particle size of 1 μm or less are preferably selected from agglomerated particles.

The average particle size of the fine secondary particles of the optional pigment is preferably 1 μm or less, more preferably 800 nm or less still more preferably 600 nm or less, further more preferably 500 nm or less. This small particle size contributes to enhancing the gloss and the color density of the recorded ink images. The fine particle size of 500 nm or less corresponds to the particle size of colloidal particles. Most preferable range of the average particle size is from 20 nm to 300 nm.

The fine secondary particles of the optional pigment preferably comprise a plurality of primary particles having a primary particle size of 3 nm to 40 nm, more preferably 5 nm to 30 nm, still more preferably 10 to 20 nm.

For example, when amorphous silica particles having a secondary particle size of 500 nm or less and each comprising a plurality of primary particles having a primary particle size of 3 to 40 nm and agglomerated with each other, are selected as a pigment, and a recording material having at least an upper layer comprising the fine amorphous silica particles and formed on a support material is subjected to an ink jet printing, the resultant ink images exhibit a high gloss and a high color density of the images.

In a recording sheet of the present invention, a cationic polymeric material is optionally contained therein to enhance the fixing property of the ink applied thereon. The optional cationic polymeric material may be contained within the support material. Preferably, the recording material has one or more ink receiving layers formed on a supporting material and the cationic polymeric material is contained in at least an uppermost ink receiving layer. There is no limitation to the type of the optional cationic polymeric material. The optional cationic polymeric material includes various cationic polymeric compounds which produce water-insoluble salts with sulfon group or carboxyl group of dyes contained in the ink jet recording inks, and cationic resins containing secondary amines, tertiary amines and/or quaternary ammonium salts. Particularly, polyethyleneimines, polyvinyl pyridines, polyvinylamines, polymers of monoalkylamine-hydrochloric acid salts, polymers of diallylamine-hydrochloric acid salts, copolymers of monoallyl-amine-hydrochloric acid salts-diallylamine-hydrochloric acid salts, polymers of acrylamidealkyl tertianary ammonium salts, polyalkylenepolyamine-dicyanediamide condensation products, secondary amine-epichlorohydrin addition-polymerization products, and polyepoxyamines are preferably employed. The content of the optional cationic polymeric material in the recording material is preferably controlled in the range of from 0.01 to 10 g per $m^2$ of the surface area of the recording material, more preferably from 0.1 to 5 $g/m^2$.

The ink receiving layer of the present invention optionally further comprises at least one additive selected from, for example, dispersing agents, viscosity-modifiers, anti-foaming agents, coloring materials, anti-static agents, and preservatives. Optionally, for the purpose of further enhancing the light fastness, the recording material or the ink receiving layer of the present invention further comprises a light stabilizer selected from, for example, ultraviolet ray absorbers, anti-oxidants, hindered amines, and other light stabilizers.

In an embodiment, the ink jet recording material of the present invention further comprises an inorganic salt.

There is no limitation to the type of the inorganic salts. Usually, the inorganic salt is preferably selected from sodium salts, magnesium salts, calcium salts, aluminum salts, phosphorus salts, titanium salts, iron salts, nickel salts, copper salts, and zinc salts. More preferably, the inorganic salt is selected from salts of di- or more valent metals, particularly magnesium salts and calcium salts, which contribute to enhancing the light fastness for the recorded ink images. Also, the inorganic salts preferably are selected from hydrochloric acid salts sulfonic acid salts and phosphoric acid dihydrogen salts of the above-mentioned metals.

It is assumed that the inorganic salts stabilize or protect the dyes contained in the ink jet recording inks which, per se, exhibit a poor light fastness, using an unknown mechanism, to significantly enhance the light fastness of the recorded ink images.

There is no limitation to the contents of the inorganic salts. Usually, the contents of the inorganic salts in the recording material are 0.01 to 2 g per $m^2$ of the surface area of the recording material. When the contents are less than 0.01 $g/m^2$, the resultant light fastness-enhancing effect may be unsatisfactory. When the contents are more than 2 $g/m^2$, the light fastness-enhancing effect may be saturated. The inorganic salts may be coated on the ink receiving layer.

There is no limitation on the layer structure of the ink jet recording material comprising the inorganic salts. The support sheet may be a paper sheet produced from a pulp slurry containing the inorganic salts by a paper-forming method, or a polymer film produced from a film-forming material mixed with the inorganic salts, or a paper sheet press-sized or impregnated with a liquid containing the inorganic salts, or a coated paper sheet produced by coating a paper sheet with a coating liquid containing the inorganic salts.

Preferably, at least one ink receiving layer comprising, as principal components, the light fastness enhancing agent and the composite particles is formed on a support material. In this case, a coated paper-like recording sheet is obtained. Preferably, at least an uppermost layer of the ink receiving layer contains the inorganic salts in addition to the light fastness enhancing agent and the composite particles, or the uppermost layer is coated with a coating liquid containing the inorganic salts.

As a component of the ink receiving layer, various hydrophilic polymeric materials (resins) are employed, and, optionally, are mixed with pigments. In this case, a recording material having excellent water resistance, a good ink-absorption rate, and a good ink-drying property is obtained. The hydrophobic resin and optionally the pigment may be contained within the support material. In this case, the resultant support material has an appearance similar to that of a woodfree paper sheet.

More preferably, the hydrophobic resins and optionally the pigments are contained, as principal components, in the ink receiving layer formed on a supporting material.

When a mat ink jet recording material having a low gloss is comprised of the phosphoric acid salts and/or the nitric acid salts, the resultant light fastness-enhancing effect is not very high. The reasons for this phenomenon have not yet been made clear. It is assumed that, as the ink receiving layer of the mat ink jet recording material is usually formed from pigment particles having a particle size of several μm and a binder, the phosphoric acid salts and the nitric acid salts added to the ink receiving layer are easily absorbed in the gaps between the pigment particles, and thus cannot exhibit the light fastness-enhancing effect. However, in the present invention, to provide an ink jet recording material capable of recording ink images having an excellent color density and sharpness thereon, the gloss of the recording material surface is enhanced.

In the recording material of the present invention, the ink receiving layer is formed from a composition which causes a diffused reflection of light on the ink receiving layer to be difficult, to enhance the gloss of the ink receiving layer surface. In this case, the resultant ink receiving layer exhibits a low light fastness and a short life, for unknown reasons. When the phosphoric acid salts on nitric acid salts are contained in the ink receiving layer of the ink jet recording material having a high gloss, the salts exhibit a high light fastness-enhancing effect on the ink images recorded on the ink receiving layer.

The ink receiving layer may be formed only of the above-mentioned layer. To enhance the ink-absorbing property, the ink receiving layer can be multi-layered. In the multi-layered ink receiving layer, at least one special layer, preferably an upperlayer, preferably has the above-mentioned structure. The special layer may contain the above-mentioned polymeric materials (resins). Also, the special layer may contain a pigment having the above-mentioned specific particle size or an other pigment having another particle size and a binder resin, and optionally a cationic polymeric material (resin).

There is no limitation to the amount of the ink receiving layer. Usually, the ink receiving layer is preferably formed in an amount of 3 to 60 $g/m^2$, more preferably 10 to 50 $g/m^2$, in a single layer structure. When the ink receiving layer is formed in a multi-layered structure, the upper layer is preferably in an amount of 3 to 30 $g/m^2$, more preferably 5 to 20 $g/m^2$ and the lower layer is preferably in an amount of 1 to 50 $g/m^2$, more preferably 5 to 40 $g/m^2$.

In the ink jet recording material of the present invention, the support material is not limited to a specific form of material. The support material may be transparent or may be opaque. The support material is formed from at least one member selected from various paper sheets, for example, woodfree paper sheets, art paper sheets, coated paper sheets, cast-coated paper sheets, foil-laminated paper sheets, kraft paper sheets, polyethylene-laminated paper sheets, impregnated paper sheets, metallized paper sheets and water-soluble paper sheets; cellulose films; plastic films, for example, polyethylene, propylene, soft polyvinyl chloride, hard polyvinyl chloride, and polyester films; metal foils and synthetic paper sheets.

The ink receiving layer is formed on the support material by using conventional coating means, for example, die coater, blade coater, air knife coater, roll coater, bar coater, gravure coater, rod blade coater, lip coater and curtain coater.

In the present invention, the ink receiving layer having a high gloss can be formed in such a manner that at least one layer, preferably an upper layer to which the ink images are recorded, is formed, in the form of a film, on a casting surface of a casting base; the surface of the support material (or, when the ink receiving layer is in a multi-layered structure, a surface of a layer formed on the support material) is brought into contact with and adhered to the layer surface on the casting surface under pressure, to transfer the casted layer from the casting surface to the support material; and the resultant composite consisting of the support material and the transferred layer is separated from the casting surface.

The casting base having the casting surface is preferably selected from sheet materials having a high surface smoothness and a high flexibility, for example, cellulose films, and plastic films, for example polyethylene polypropylene, soft polyvinyl chloride, hard polyvinyl chloride, and polyester films; paper sheets, for example, polyethylene-laminated paper sheets, glassine paper sheets, impregnated paper sheets, and metallized paper sheets; metal foils, and synthetic paper sheets. Also, the casting base may be selected from drums and plates consisting of an inorganic glass, metal or plastics, having a high surface smoothness. Preferably, plastic films (for example, polyethylene, polypropylene and polyester films) and metal drums having a high smoothness surface are preferably employed as a casting base, because these casting bases enable the casted layer to be easily formed and the resultant casted layer can be easily separated from the casting surface.

For the purpose of imparting a high smoothness to the ink receiving layer, the casting surface preferably has a high smoothness. In this case, the casting surface preferably has a surface roughness Ra of 0.5 $\mu$m or less, more preferably 0.05 $\mu$m or less, determined in accordance with Japanese Industrial Standard (JIS) B 0601.

The ink receiving layer may have a semi-gloss surface or mat surface which can be formed by controlling the surface roughness Ra of the casting surface.

The casting surface may be a non-surface treated surface. However, to control the adhesion between the casted layer for the ink receiving layer and the support material (or other layer of the ink receiving layer when the ink receiving layer is in a multi-layered structure) to a level lower than the adhesion between the casting surface and the cast layer, the casting surface of the casting base is preferably coated with a releasing material, for example, a silicone or fluorine-containing compound. As long as the cast layer formed on the casting surface can be adhered to the support material (or a coating layer coated on the support material when the ink receiving layer has a multi-layered structure), there is no limitation to the adhesion method for the cast layer with the support material (or the coating layer on the support material). For example, the adhesion can be effected by superposing a support material on a cast layer formed on the casting surface of a casting base consisting of a plastic film, and pressing the superposed composite by passing it through a pair of pressing rollers. When the casting base is a casting drum having a casting peripheral surface, the superposed composite is pressed between the casting drum and a pressing roller. Also, when the superposed composite must be heated, the press rollers or the casting drum may be utilized as a heater. The adhesion can be effected only by heating at a temperature of preferably 30 to 100° C. and by pressing under a pressure of preferably 49–1471 N/cm (5 to 150 kg/cm). Preferably, during the adhesion procedure, the water content of the upper layer and/or the lower layer of the ink receiving layer is controlled to 50 to 350% based on the total bone-dry weight of the ink receiving layer, by blowing water vapor or by applying water to the layer or layers, in other words, water is imparted in an amount of 50 to 350 parts by weight per 100 parts by bone-dry weight of the ink receiving layer to the upper layer and/or the lower layer; and then the water content-controlled superposed composite is pressed. The support material may have an intermediate layer (formed from an adhesive or pressure-sensitive adhesive and having a adhesive property or sticking property) and may be adhered to the cast layer through the intermediate layer. More preferably, the intermediate layer has an ink-absorbing property, and thus can be utilized as a portion of the ink receiving layer. In this case, the ink-absorbing intermediate layer is formed on the support material, and then while in wetted condition the intermediate layer is adhered to the casted layer and dried.

The ink usable for the ink jet recording material of the present invention must comprise, as indispensable components, a coloring material for forming colored images and a liquid medium for dissolving or dispersing the coloring material therein. The ink optionally contains at least one additive selected from, for example, dispersing agents, viscosity modifiers, specific resistively modifiers, pH modifiers, mildewproofing agents, stabilizers for dissolution or dispersion of the coloring materials, and surfactants other than the above-mentioned agents.

The coloring material usable for the ink may be selected from direct dyes, acid dyes, basic dyes, reactive dyes, edible coloring matters, disperse dyes, oil dyes and coloring pigments. These coloring materials can be selected from conventional coloring materials without limitation. The content of the coloring material in the ink is designed in response to the type of the liquid medium and the requirements for the ink. In the ink usable for the ink jet recording material of the present invention, the coloring material is continued in an amount similar to that of the conventional inks, namely in a content of 0.1 to 20% by weight.

The liquid medium of the ink usable for the ink jet recording material of the present invention comprises at least one member selected from water and water-soluble organic solvents, for example, alkyl alcohols having 1 to 4 carbon atoms, such as methyl alcohol, ethyl alcohol, n-propyl alcohol, isopropyl alcohol, n-butyl alcohol, isobutyl alcohol; ketones and ketone alcohols, polyalkylene glycols, alkylene glycols in which the alkylene group has 2 to 6 carbon atoms, and lower alkyl ($C_2$ to $C_5$) ethers of polyhydric alcohols.

EXAMPLES

The present invention will be further explained by the following examples which are not intended to restrict the scope of the present invention in any way.

Example 1

A trade available coated paper sheet (trademark: OK COAT, made by OJI PAPER CO., LTD.) having a basis weight of 127.9 g/$m^2$ was coated on a surface thereof with a coating liquid having the composition shown below and a solid content of 7% by using a die coater and dried to form an ink receiving layer on the paper sheet. The dry weight of the resultant ink receiving layer was 20 g/$m^2$.

Coating liquid composition
(total solid content: 7% by weight)

| Component | Part by dry weight |
|---|---|
| Silica sol A | 100 |
| Polyvinyl alcohol (trademark: PVA-135H, made by K.K. KURARAY) | 35 |
| Sodium ρ-hydroxybenzenesulfonate (Chemical reagent grade, made by KANTO KAGAKU K.K.) | 5 |

Preparation of Silica-cationic Resin Composite Sol A

A synthetic amorphous silica (trademark: NIPSIL HD-2, made by NIPPON SILICA KOGYO K.K.) having a primary particle size of 11 nm and an average agglomerated particle size of 3 μm was pulverized and dispersed by a sand grinder and then further pulverized and dispersed by a pressure type homogenizer, and the pulverizing and dispersing procedures by the sand grinder and the pressure type homogenizer were repeated until the average agglomerated particle size reached 70 nm, to prepare an aqueous dispersion containing the amorphous silica at a dry content of 8% by weight.

The aqueous amorphous silica dispersion in an amount of 100 parts by solid weight was mixed with 15 parts by solid weight of a cationic resin comprising of polydiallyldimethyl ammonium chloride having a molecular weight of 120,000 (trademark: PAS-H-10L, made by NITTO BOSEKI KOGYO K.K.) to increase the viscosity of the dispersion and then to coagulate the dispersion. The resultant coagulation was pulverized and dispersed by using a sand grinder and further pulverized and dispersed by using a pressure type homogenizer, and the pulverizing and dispersing procedures using the sand grinder and the pressure type homogenizer were repeated until the average particle size reached 490 nm. The resultant aqueous silica-cationic resin composite sol A had a solid content of 9% by dry weight.

Example 2

An ink jet recording paper sheet was prepared by coating a surface of a trade-available paper sheet (trademark: OK COAT, made by OJI PAPER CO., LTD) having a basis weight of 127.9 g/$m^2$ with a coating liquid, for an ink receiving layer having the composition as shown below.

Coating liquid composition
(total solid content: 7% by weight)

| Component | Part by dry weight |
|---|---|
| Silica-cationic resin composite sol A | 100 |
| Polyvinyl alcohol (trademark: PVA-135H, made by K.K. KURARAY) | 35 |

Then, the resultant ink receiving layer was coated with a 10% by weight aqueous solution of sodium ρ-hydroxybenzenesulfonate (chemical reagent grade, made by KANTO KAGAKU K.K.) by using a bar coater and dried, to cause the sodium ρ-hydroxybenzenesulfonate to be contained in a dry amount of 1.0 g/$m^2$ in the ink receiving layer.

Example 3

An ink jet recording paper sheet was produced by the following procedures.

An aqueous coating liquid containing 100 parts by weight of the silica-cationic resin composite sol A and 35 parts by weight of polyvinyl alcohol (trademark: PVA-135H, made by KURARAY K.K.) and having a solid content of 7% by weight was coated, by using a bar coater, on a surface of a casting base consisting of a PET film (trademark: LUMILER T, made by TORAY INDUSTRIES INC.) having a thickness of 50 μm, and dried, to form a coating layer having a dry weight of 20 g/$m^2$. The coating layer was coated with a 10% by weight aqueous solution of sodium ρ-hydroxybenzenesulfonate by using a bar coater and dried, to cause the sodium ρ-hydroxybenzenesulfonate to be contained in a dry weight of 1.0 g/$m^2$ in the coating layer and to form an upper layer of an ink receiving layer.

The same coating liquid as mentioned above was coated in a solid amount of 10 g/$m^2$ on a surface of a trade available coated paper sheet (trademark: OK COAT, made by OJI PAPER CO.) having a basis weight of 127.9 g/$m^2$, the coated paper sheet was superposed on the coating layer on the PET film surface in a manner such that the coating layer on the paper sheet came into contact with the coating layer on the PET film, the superposed composite was dried and the PET film was peeled off from the resultant ink jet recording sheet.

Example 4

An ink jet recording sheet was prepared by the same procedures as in Example 1, except that a cation resin (polydiallyldimethyl ammonium chloride) having a molecular weight of 200,000 was employed in place of the cationic resin having a molecular weight of 120,000.

Comparative Example 1

A trade available coated paper sheet (trademark: OK COAT, made by OJI PAPER CO., LTD.) having a basis weight of 127.9 g/$m^2$ was coated on a surface thereof with a coating liquid having the composition shown below and a solid content of 7% by using a die coater and dried to form an ink receiving layer on the paper sheet. The dry weight of the resultant ink receiving layer was 20 g/$m^2$.

| Coating liquid composition (total solid content: 7% by weight) | |
|---|---|
| Component | Part by dry weight |
| Amorphous silica (trademark: FINESIL X-45, made by TOKUYAMA K.K., average agglomerated particle size: 4.5 $\mu$m) | 100 |
| Silyl-modified polyvinyl alcohol (trademark: PVA-R-1130, made by K.K. KURARAY) | 35 |
| Cationic resin (Polydiallyldimethyl ammonium chloride, (trademark: PAS-H-10L, made by NITTO BOSEKI K.K.) | 15 |

Comparative Example 2

An ink jet recording paper sheet was prepared in the same procedures as in Comparative Example 1, except that in the coating liquid for the ink receiving layer further contained 5 parts by dry weight of tannic acid (chemical reagent grade, made by KANTO KAGAKU K.K.)

Comparative Example 3

An ink jet recording paper sheet was prepared in the same procedures as in Comparative Example 1, except that in the coating liquid for the ink receiving layer further contained 5 parts by dry weight of sodium benzenesufonalte (chemical reagent grade, made by KANTO KAGAKU K.K.).

Comparative Example 4

An ink jet recording sheet was prepared by the same procedures as in Example 1, except that a cation resin (polydiallyldimethyl ammonium chloride) having a molecular weight of 80,000 was employed in place of the cationic resin having a molecular weight of 120,000.

Comparative Example 5

An ink jet recording paper sheet was prepared by the same procedures as in Example 1, except that a cation resin (polydiallyldimethyl ammonium chloride) having a molecular weight of 50,000 was employed in place of the cationic resin having a molecular weight of 120,000.

Tests

The ink jet recording sheets of the Examples 1 to 4 and Comparative Examples 1 to 5 were subjected to the tests for evaluating the color density, and light fastness and water resistance of ink images recorded thereon.

The tests were carried out by the following methods.

In the tests, the recording sheet were printed by using an ink jet printer (trademark: PM-750C, made by EPSON).

(1) Color Density of Recorded Images

A solid print was formed with a black-colored ink on each recording sheet, and the color density of the solid print was measured three times by the Macbeth reflection color density tester (model: RD-920, made by Macbeth). An average of the measured color density data was calculated.

(2) Light Fastness of Recorded Images

On each recording sheet, ISO-400 images ("High accuracy color digital standard image data, ISO/JIS-SCID", page 13, name of image: Fruit basket, and page 14, name of image: Candle, published by ZAIDANHOGIN NIPPON KIKAKU KYOKAI) in a gloss paper mode, and the printed images were subjected to a continuous fading treatment using a xenon lamp-using FADE-OMETER (model: CI35F, made by ATLAS ELECTRIC DEVICES CO.) at 63° C. at 50% RH for 50 hours. The tested images were compared with the original images and evaluated as follows.

| Class | Tested images |
|---|---|
| 4 | Substantially no color-fading is found. |
| 3 | Slight color-fading is found. Practically usable. |
| 2 | Color is faded to such an extent that color balance is lost. Practically unusable. |
| 1 | Color is greatly faded and color balance is significantly lost. |

(3) Water Resistant of Recorded Images

After the recorded sheet was left to stand for 24 hours in the ambient atmosphere, a drop of water was placed on the images, and one minute after the placing, the water drop was removed by wiping. The water-wetted portion of the images was observed by the naked eye to evaluate the water resistance of the images as follows.

| Class | Water resistance |
|---|---|
| 3 | Substantially no ink in the images was removed. |
| 2 | A portion of the ink in the images was removed. |
| 1 | The ink images were completely removed. |

(4) Hot Moisture Resistance of Recorded Images

After the recorded sheet was left to stand in an atmosphere at a temperature of 20° C. at a relative humidity of 50% for 24 hours and then in another atmosphere at a temperature of 40° C. at a relative humidity of 85% for 96 hours. The hot moisture-exposed images was observed by naked eye to evaluate the degree of the blotting of the images, as follows.

| Class | Resistance of images to blotting |
|---|---|
| 4 | No blotting was found. |
| 3 | Slight blotting was found. Practically usable. |
| 2 | Apparent blotting was found. Practical employment is disadvantageous. |
| 1 | Significant blotting was found. |

This hot moisture resistance test was applied to the ink jet recording sheets of Examples 1 and 4 and Comparative Examples 4 and 5.

The test results are shown in Table 1.

TABLE 1

| Example No. | | Item Recorded ink images: color density | Light fastness | Water resistance | Hot moisture resistance |
|---|---|---|---|---|---|
| Example | 1 | 2.40 | 4 | 3 | 3 |
| | 2 | 2.35 | 4 | 3 | — |
| | 3 | 2.50 | 4 | 3 | — |
| | 4 | 2.42 | 4 | 3 | 4 |
| Comparative | 1 | 1.78 | 1 | 2 | — |
| Example | 2 | 1.72 | 2 | 3 | — |
| | 3 | 1.70 | 2 | 3 | — |
| | 4 | 2.39 | 4 | 3 | 2 |
| | 5 | 2.35 | 4 | 3 | 1 |

Table 1 clearly shows that the ink jet recording sheets of Examples 1 to 4 containing the light fastness-enhancing agent enabled the recorded ink images to exhibit a high light fastness and satisfactory hot moisture resistance. Particularly, the light fastness was very excellent in Examples 1 to 4 wherein a phenolsulfonic acid salt was employed as a light fastness enhancing agent. Further, in Examples 1 to 4 wherein a pigment-cationic resin composite particles were employed in addition to the light fastness-enhancing agent, the resultant ink jet recording sheet enabled the ink images recorded thereon to exhibit a high color density, a high water resistance and a high hot moisture resistance. Also, in Examples 1 to 4 wherein the silica-cationic resin composite particles having a particle size of 1000 nm or less, the recorded ink images exhibited an enhanced sharpness.

In Comparative Example 1 wherein no light fastness-enhancing agent was employed, the recorded ink images exhibited a poor light fastness. Also, in Comparative Examples 2 and 3 wherein light fastness-enhancing agents other than that of the present invention were used, the resultant ink images exhibited an unsatisfactory light fastness.

Also, in Composite Examples 4 and 5 wherein the cationic resin in the silica-cationic resin composite particles had a molecular weight of less than 120,000, the recorded images exhibited a poor resistance to hot moisture.

Example 5

An ink jet recording paper sheet was produced by coating a trade-available coated paper sheet (trademark: OK COAT, made by OJI PAPER CO., LTD.) having a basis weight of 127.9 g/m$^2$ with a coating liquid having the composition shown below by using a die coater and dried, to form an ink receiving layer having a dry weight of 20 g/m$^2$.

Coating liquid composition (total solid content: 7% by weight)

| Component | Part by dry weight |
|---|---|
| Silica sol B | 100 |
| Polyvinyl alcohol (trademark: PVA-135H, made by K.K. KURARAY) | 35 |
| Sodium ρ-hydroxybenzenesulfonate (Chemical reagent grade, made by KANTO KAGAKU K.K.) | 8 |
| Calcium chloride (Chemical reagent grade, made by KANTO KAGAKU K.K.) | |

-continued

Preparation of Silica-cationic Resin Composite B

A synthetic amorphous silica (trademark: NIPSIL HD-2, made by NIPPON SILICA KOGYO K.K.) having a primary particle size of 11 nm and an average agglomerated particle size of 3 μm was pulverized and dispersed by a sand grinder and then further pulverized and dispersed by a pressure type homogenizer, and the pulverizing and dispersing procedures using the sand grinder and the pressure type homogenizer were repeated until the average agglomerated particle size reached 70 nm, to prepare an aqueous dispersion containing the amorphous silica in a dry content of 8% by weight.

The aqueous amorphous silica dispersion in an amount of 100 parts by solid weight was mixed with 15 parts by solid weight of a cationic resin comprising of polydiallyldimethyl ammonium chloride (trademark: PAS-H-10L, made by NITTO BOSEKI KOGYO K.K.) to increase the viscosity of the dispersion and then to coagulate the dispersion. The resultant coagulation was pulverized and dispersed by using a sand grinder and further pulverized and dispersed by using a pressure type homogenizer, and the pulverizing and dispersing procedures by the sand grinder and the pressure type homogenizer were repeated until the average composite particle size reached 490 nm. The resultant aqueous silica-cationic resin composite sol B had a solid content of 9% by dry weight.

Example 6

An ink jet recording sheet was produced by the following procedures.

The same coating liquid as in Example 5, except that the amount of the sodium ρ-hydroxybenzenesulfonate was changed from 8 parts by weight to 6 parts by weight and the amount of calcium chloride was changed from 8 parts by weight to 6 parts by weight, was coated by using a bar coater on a surface of a casting base consisting of a PET film (trademark: LUMILER T, made by TORAY INDUSTRIES INC.) having a thickness of 50 μm and dried, to form a coating layer having a dry weight of 20 g/m$^2$, to form an upper layer of an ink receiving layer.

The same coating liquid as mentioned above was coated in a solid amount of 10 g/m$^2$ on a surface of a trade available coated paper sheet (trademark: OK COAT, made by OJI PAPER CO.) having a basis weight of 127.9 g/m$^2$, the coated paper sheet was superposed on the coating layer on the PET film surface in a manner such that the coating layer on the paper sheet came into contact with the coating layer on the PET film, the superposed composite was dried and the PET film was peeled off from the resultant ink jet recording sheet.

Comparative Example 6

An ink jet recording paper sheet was prepared in the same procedures as in Example 5, except that, in the coating liquid, no sodium ρ-hydroxybenzenesulfonate and no calcium chloride were contained.

Comparative Example 7

An ink jet recording paper sheet was prepared in the same procedures as in Example 5, except that, in the coating liquid, no sodium ρ-hydroxybenzenesulfonate was contained and the content of calcium chloride was changed to 16 parts by weight.

Comparative Example 8

An ink jet recording sheet was prepared in the same procedures as in Example 5, except that, in the coating liquid, no sodium ρ-hydroxybenzenesulfonate and no calcium chloride were contained and a hindered amine photostabilizer (trademark: TINUBIN 144, made by CIBA-GEIGY) was contained in an amount of 16 parts by weight.

Tests

The ink jet recording sheets of Examples 5 and 6 and Comparative Examples 6 to 8 were subjected to the tests for evaluating the color density, light fastness and water resistance of ink images recorded thereon.

The tests were carried out by the following methods.

In the tests, the recording sheet were printed by using an ink jet printer (trademark: PM-750C, made by EPSON).

(1) Color Density of Recorded Images

A solid print was formed with a black-colored ink on each recording sheet, and the color density of the solid print was measured three times by the Macbeth reflection color density tester (model: RD-920, made by Macbeth). An average of the measured color density data was calculated.

(2) Light Fastness of Recorded Images

On each recording sheet, ISO-400 images ("High accuracy color digital standard image data, ISO/JIS-SCID", page 13, name of image: Fruit basket, and page 14, name of image: Candle, published by ZAIDANHOGIN NIPPON KIKAKU KYOKAI) in a gloss paper mode, and the printed images was subjected to a continuous fading treatment using a xenon lamp-using FADE-OMETER (model: CI35F, made by ATLAS ELECTRIC DEVICES CO.) at 63° C. at 50% RH for 50 hours. The tested images were compared with the original images and evaluated as follows.

| Class | Tested images |
|---|---|
| 5 | Substantially no color-fading is found. |
| 4 | Slight color-fading is found. |
| 3 | Color is faded and color balance is slightly lost. Practically usable. |
| 2 | Color is faded to such an extent that color balance is lost. Practically unusable. |
| 1 | Color is greatly faded and color balance is significantly lost. |

(3) Water Resistant of Recorded Images

After the recorded sheet was left to stand for 24 hours in the ambient atmosphere, a drop of water was placed on the images, and one minute after the placing, the water drop was removed by wiping. The water-wetted portion of the images was observed by the naked eye to evaluate the water resistance of the images as follows.

| Class | Water resistance |
|---|---|
| 3 | Substantially no ink in the images was removed. |
| 2 | A portion of the ink in the images was removed. |
| 1 | The ink images were completely removed. |

The test results are shown in Table 2.

TABLE 2

| | | Item | | |
|---|---|---|---|---|
| | | Recorded ink images | | |
| Example No. | | color density | Light fastness | Water resistance |
| Example | 5 | 2.20 | 5 | 3 |
| | 6 | 2.36 | 5 | 3 |
| Comparative Example | 6 | 2.35 | 1 | 3 |
| | 7 | 2.10 | 2 | 3 |
| | 8 | 2.05 | 2 | 3 |

Table 2 clearly shows that the ink jet recording sheets of Examples 5 and 6 in which an inorganic salt and a phenol compound are contained in addition to the light fastness enhancing agent and the silica-cationic resin composite particles having an average particle size of 490 nm, enabled the recorded ink images thereon to exhibit an excellent light fastness. Particularly, on the recording sheets of Examples 5 and 6 wherein sodium p-hydroxybenzenesulfonate and calcium chloride are contained, the recorded ink images exhibited an excellent light fastness. Also on the recording sheets of Examples 5 and 6 containing the silica-cationic resin composite particles in addition to the light fastness-enhancing agent, the recorded ink images exhibited a high color density and a high water resistance.

Especially, in Examples 5 and 6 wherein the fine silica particles contained in the composite particles and having a particle size of 70 nm were employed, the ink images recorded on the resultant recording sheet exhibited a very high color density and sharpness.

In the recording sheet of Comparative Example 6 containing no light fastness-enhancing agent, the recorded ink images exhibited a poor light fastness.

In the recording sheet of Comparative Example 7 containing only an inorganic salt, the recorded ink images exhibited an unsatisfactory light fastness.

In the recording sheet of Comparative Example 8, the light fastness-enhancing effect of the hindered amine photostabilizer for the recorded ink images was insufficient and unsatisfactory.

The ink jet recording material of the present invention enables the ink images recorded thereon to exhibit a significantly enhanced resistance to light fading.

What is claimed is:

1. An ink jet recording material comprising a support material and at least one ink receiving layer formed on at least one surface of the support material and comprising a light fastness-enhancing agent for ink images received on the ink receiving layer, and a plurality of composite particles prepared from an inorganic pigment and a cationic polymeric material, wherein (1) the light fastness-enhancing agent comprises at least one member selected from the group consisting of hydroquinone-β-D-glucoside, salts of pyrocatechol-3,5-disulfonic acid and salts of p-hydroxybenzenesulfonic acid;

(2) the inorganic pigment comprises a plurality of secondary particles having an average particle size of 10 to 500 nm, each secondary particle comprising a plurality of primary particles having an average primary particle size of 3 to 40 nm, and agglomerated with each other to form secondary particle;

(3) the cationic polymeric material has a molecular weight of 100,000 or more; and (4) the composite particles of the inorganic pigment particles and the cationic polymeric material are those prepared by mixing an agueous dispersion of inorganic pigment particles with a cationic polymeric material, to cause the aqueous dispersion of the inorganic pigment particles to be coagulated with the cationic polymeric material, and subjecting the resultant coagulate of the inorganic pigment with the cationic polymeric material to pulverization, to form inorganic pigment-cationic polymeric material composite particles having an average composite particle size of 10 to 1,000 nm.

2. The ink jet recording material as claimed in claim 1, wherein the light fastness enhancing agent is present in an amount of 0.3 to 30% by mass based on the mass of the ink receiving layer.

3. The ink jet recording material as claimed in claim 2, wherein the amount of the light fastness-enhancing agent is 1 to 10% by mass based on the mass of the ink receiving layer.

4. The ink jet recording material as claimed in claim 1, wherein the salts of pyrocatechol-3,5-disulfonic acid and the salt of p-hydroxy-benzenesulfonic acid are sodium pyrocatechol-3,5-disulfonate and sodium p-hydroxy-benzenesulfonate, respectively.

5. The ink jet recording material as claimed in claim 1, wherein the inorganic pigment comprises at least one member selected from the group consisting of silica, alumina and alumiosilicate.

6. The ink jet recording material as claimed in claim 1, wherein the cationic polymeric material comprises at least one member selected from polydiallyldimethyl ammonium chloride, polyacrylamide, polydiallyamine-hdyrochlorate acid salt, polyvinylamine, polyalkylenepolyamine-dicyandiamide condensation product, and polymers and copolymers of secondary amine-epichlorohydrin.

7. The ink jet recording material as claimed in claim 1, wherein a ratio in mass of the inorganic pigment to the cationic polymeric material is 100:1 to 100:50.

8. The ink jet recording material as claimed in claim 7, wherein the ratio in mass of the inorganic pigment to the cationic material is in the range of from 100:2 to 100:30.

9. The ink jet recording material as claimed in claim 1, wherein the inorganic pigment-cationic polymeric material composite particles are present in an amount of 70 to 95% by mass in the ink receiving layer.

10. The ink jet recording material as claimed in claim 1, wherein in the inorganic pigment-cationic polymeric material composite particles contained in the ink receiving layer the cationic polymeric material is present in an amount of 0.01 to 10 g per $m^2$ of the surface area of the recording material.

11. The ink jet recording material as claimed in claim 1, wherein the ink receiving layer is formed on the support material in such a manner that a layer containing the light fastness-enhancing agent and the inorganic pigment-cationic polymeric material composite particles is formed on a casting surface of a casting base, and then is brought into contact with a surface of the support material under pressure so as to transfer the cast layer to the support material surface, and the cast layer on the support material is separated from the casting surface of the casting base.

12. The ink jet recording material as claimed in claim 1, having a gloss of 20% or more determined at incident and reflection angles of 75 degrees in accordance with Japanese Industrial Standard P8142.

13. The ink jet recording material as claimed in claim 1, wherein the ink receiving layer further comprises at least one inorganic salt.

14. The ink jet recording material as claimed in claim 13, wherein the inorganic salt is selected from inorganic salts of di- or more valence metals.

15. The ink jet recording material as claimed in claim 13, wherein the inorganic salt is selected from the group consisting of inorganic magnesium salts and inorganic calcium salts.

16. The ink jet recording material as claimed in claim 1, wherein the ink receiving layer further comprises at least one member selected from the group consisting of salts of phosphoric acid and salts of nitric acid.

17. The ink jet recording material as claimed in claim 1, wherein the ink receiving layer further comprises at least one member selected from the group consisting of salts of phosphoric acid and slats of nitric acid.

* * * * *

UNITED STATES PATENT AND TRADEMARK OFFICE

CERTIFICATE OF CORRECTION

PATENT NO. : 6,713,160 B2
DATED : March 30, 2004
INVENTOR(S) : Kitamura et al.

It is certified that error appears in the above-identified patent and that said Letters Patent is hereby corrected as shown below:

Title page,
Item [56], References Cited, U.S. PATENT DOCUMENTS, please add the following references to the listing:

| | | |
|---|---|---|
| -- 5,073,448 | 12/17/91 | Vieira et al. |
| 5,916,673 | 6/1999 | Fryberg et al. |
| 6,165,606 | 12/2000 | Kasahara et al. |
| 5,500,668 | 3/1996 | Malhotra et al. -- |

FOREIGN PATENT DOCUMENTS, please add the following references to the listing:

| | | |
|---|---|---|
| -- 57087988 | 6/1/82 | Japan |
| 61146591 | 7/4/86 | Japan |
| 04201594 | 7/22/92 | Japan |
| 61057380 | 3/24/86 | Japan |
| 57087987 | 6/1/82 | Japan |
| 0373573A1 | 6/20/90 | Europe |
| 0696515A1 | 2/14/96 | Europe |
| 0046416A2 | 2/24/82 | Europe |
| 0878323A1 | 11/18/98 | Europe |
| 0956970A1 | 11/17/99 | Europe |
| 0897808A1 | 2/24/99 | Europe |
| JP-A-11-348419 | 12/21/99 | Japan |
| JP-60-72785 | 4/1985 | Japan -- |

OTHER PUBLICATIONS, please add the following references to the listing:

-- "Graphic Technology-Prepress Digital Data Exchange-Standard Colour Image Data (SCID)", ISO/JIS-SCID, pp. 13-14, December 25, 1995.

UNITED STATES PATENT AND TRADEMARK OFFICE

CERTIFICATE OF CORRECTION

PATENT NO. : 6,713,160 B2 Page 2 of 2
DATED : March 30, 2004
INVENTOR(S) : Kitamura et al.

It is certified that error appears in the above-identified patent and that said Letters Patent is hereby corrected as shown below:

OTHER PUBLICATIONS, cont'd.,
"Testing Method for 75º Specular Gloss of Paper and Paperboard," Japanese Industrial Standard JIS P 8142, 1965

Abstract of Japanese Patent Publ. No. 01214471; dated August 28, 1989

Abstract of Japanese Patent Publ. No. 58008684; dated January 28, 1983 --.

Signed and Sealed this

Third Day of August, 2004

JON W. DUDAS
*Acting Director of the United States Patent and Trademark Office*